(12) United States Patent
Lu (10) Patent No.: US 12,491,129 B1
(45) Date of Patent: Dec. 9, 2025

(54) GRADIENT COLOR MASSAGER AND PREPARATION METHOD THEREFOR

(71) Applicant: Dongguan Vulcanpro Silicone Rubber Industrial Co., Ltd, Guangdong (CN)

(72) Inventor: Anlin Lu, Guangdong (CN)

(73) Assignee: Dongguan Vulcanpro Silicone Rubber Industrial Co., Ltd., Guangdong (CN)

( * ) Notice: Subject to any disclaimer, the term of this patent is extended or adjusted under 35 U.S.C. 154(b) by 0 days.

(21) Appl. No.: 18/954,603

(22) Filed: Nov. 21, 2024

(30) Foreign Application Priority Data

Nov. 13, 2024 (CN) .......................... 202411620833.8

(51) Int. Cl.
| | | |
|---|---|---|
| *A61H 23/02* | (2006.01) | |
| *A61H 19/00* | (2006.01) | |
| *B29C 39/02* | (2006.01) | |
| *B29C 39/10* | (2006.01) | |
| *B29K 83/00* | (2006.01) | |
| *B29K 105/00* | (2006.01) | |
| *B29K 105/16* | (2006.01) | |
| *C08L 83/06* | (2006.01) | |
| *B29L 31/00* | (2006.01) | |

(52) U.S. Cl.
CPC ......... *A61H 23/0254* (2013.01); *A61H 19/00* (2013.01); *C08L 83/06* (2013.01); *A61H 2201/169* (2013.01); *B29C 39/023* (2013.01); *B29C 39/10* (2013.01); *B29K 2083/005* (2013.01); *B29K 2105/0032* (2013.01); *B29K 2105/16* (2013.01); *B29K 2995/0021* (2013.01); *B29L 2031/753* (2013.01)

(58) Field of Classification Search
CPC ...................... A61H 23/0254; A61H 2201/169
See application file for complete search history.

(56) References Cited

U.S. PATENT DOCUMENTS

| | | | |
|---|---|---|---|
| 9,949,889 B2 * | 4/2018 | Courtion | ................ A61H 23/02 |
| 2006/0135892 A1 | 6/2006 | Nan | |
| 2008/0207990 A1 * | 8/2008 | Nan | ........ A61H 19/44 600/38 |
| 2011/0071445 A1 * | 3/2011 | Imboden | ............ A61H 23/0263 601/46 |
| 2011/0082332 A1 * | 4/2011 | Lee | ........ A61H 23/00 600/38 |
| 2014/0148740 A1 * | 5/2014 | Howsam | ................ A61H 23/00 206/524.1 |
| 2023/0057267 A1 * | 2/2023 | DAgostino | ........ A61B 10/0012 |
| 2023/0120283 A1 * | 4/2023 | Hoch | .............. A61H 19/44 600/38 |

(Continued)

FOREIGN PATENT DOCUMENTS

| | | |
|---|---|---|
| CN | 104780889 A | 7/2015 |
| CN | 211214294 U | 8/2020 |
| CN | 219001080 U | 5/2023 |

(Continued)

*Primary Examiner* — Tu A Vo
*Assistant Examiner* — Kelsey E Baller
(74) *Attorney, Agent, or Firm* — Cooper Legal Group, LLC (57) ABSTRACT

A gradient color massager includes a non-transparent core and a single-colored transparent cover wrapped around the outer surface of the non-transparent core. A vibrator is provided in the non-transparent core, and the thickness of each area of the outer surface of the single-colored transparent cover to the non-transparent core varies.

7 Claims, 5 Drawing Sheets

(56) References Cited

U.S. PATENT DOCUMENTS

2024/0108535 A1* 4/2024 Carden .............. A61H 23/0254

FOREIGN PATENT DOCUMENTS

| | | | |
|---|---|---|---|
| DE | 8027587 U1 | 1/1981 | |
| DE | 102009038757 A1 | 3/2011 | |
| DE | 102012109409 A1 * | 5/2014 | ............. A61H 19/44 |
| JP | 2010029282 A | 2/2010 | |
| WO | WO-2021155437 A1 * | 8/2021 | |

* cited by examiner

GRADIENT COLOR MASSAGER AND PREPARATION METHOD THEREFOR

CROSS-REFERENCE TO RELATED APPLICATION

The present application is based on and claims the priority benefits of China application No. 202411620833.8, filed on Nov. 13, 2024. The entirety of China application No. 202411620833.8 is hereby incorporated by reference herein and made a part of this specification.

TECHNICAL FIELD

The present application relates to the technical field of massager, and, more particularly, to a gradient color massager and a preparation method therefor.

BACKGROUND ART

As a common healthcare device, massagers are widely used in the fields of home and personal care by massaging the skin and muscle tissues of a human body through such a method as vibration. In recent years, with people's increasing attention to health and quality of life, the massager market has developed rapidly, with increasingly diverse product types and functions. However, with the continuous growth of market demand, consumers have put forward higher requirements for the appearance and user experience of the products, especially for sealing performance and aesthetics.

The massager is provided with vibrators thereinside, which work together with the outer surface to achieve a better massage effect. At present, in order to improve the appearance of the massager, a commonly used method is to spray color paints on the surface of the protective cover, so that the surface of the massager presents a gradient color effect. Due to frequent contact with the skin and exposure to high-frequency vibrations, friction, and impact during use, the printed pattern layer on the massager is prone to detachment, which reduces its aesthetic appeal and may even cause skin allergies.

SUMMARY

In order to present a gradient color effect and improve the structural stability of a massager, the present application provides a gradient color massager and its preparation method.

In a first aspect, a gradient color massager includes a non-transparent core and a single-colored transparent cover wrapped around an outer surface of the non-transparent core. A vibrator is provided in the non-transparent core, and the thickness of the outer surface of the single-colored transparent cover toward the non-transparent core varies.

By adopting the above technical solution, the vibrator is embedded inside the non-transparent core, and then the surface of the non-transparent core is covered by a single-colored transparent cover to form a structurally stable massager. Due to the combination of the non-transparent core and the single-colored transparent cover wrapped on its outer surface, different thicknesses are formed between individual areas, so that the outer surface of the single-colored transparent cover presents a gradient color effect, improving the gradient beauty and structural stability of the massager, avoiding the occurrence of gradient color effect detachment or layer structure detachment, and improving the service life and reliability of the massager.

The single-colored transparent cover mentioned in the present application refers to a transparent cover with a non-transparent appearance, color, and the ability to see the non-transparent core through the single-colored transparent cover; and the non-transparent core refers to a core that cannot be penetrated by light.

Optionally, the single-colored transparent cover is tightly connected to the non-transparent core.

By tightly connecting the single-colored transparent cover with the non-transparent core, the gradient color massager has both better gradient color effect and structural stability, avoiding separation between the single-colored transparent cover and the non-transparent core during use, which, otherwise, may cause damage or detachment of the single-colored transparent cover, and improving the beauty and practicality of the massager.

Optionally, the non-transparent core is convexly provided with at least one first convex pattern on its outer surface, and the single-colored transparent cover is concavely provided a first concave pattern connected to the first convex pattern.

By adopting the above technical solution, at least one first convex pattern protruding from the outer surface of the non-transparent core is connected to the first concave pattern concave in the single-colored transparent cover, which improves the stability of the connection between the non-transparent core and the single-colored transparent cover. At the same time, the first concave pattern also makes the thickness of the single-colored transparent cover uneven, resulting in different clarity of the non-transparent core observed through the single-colored transparent cover, presenting a gradient color effect and enhancing the visual effect of the massager.

Optionally, the non-transparent core is concavely provided with at least one second concave pattern on its outer surface, and the single-colored transparent cover is convexly provided with a second convex pattern that is connected to the second concave pattern.

By combining the second concave and convex patterns, the connection stability between the non-transparent core and the single-colored transparent cover is further strengthened, while making the structure of the massager more stable, improving the overall durability and reliability. At the same time, it also makes the thickness of the single-colored transparent cover uneven, improving the overall gradient color effect.

Optionally, a side surface of the first convex pattern and a side surface of the first concave pattern are of an arc shape; and a side of the second convex pattern and a side of the second concave pattern are of an arc shape.

The sides of the first convex pattern and the first concave pattern, as well as the sides of the second convex pattern and the second concave pattern, are of an arc shape, which gradually changes the thickness of the single-colored transparent cover, thus presenting a better gradient color effect. At the same time, the arc surface design increases the contact area and friction between the non-transparent core and the single-colored transparent cover, improving the stability of their connection and reducing the risk of detachment or loosening.

Optionally, a top surface of the first convex pattern and a bottom surface of the first convex pattern are both of an arc shape; and a top surface of the second convex pattern and a bottom surface of the second convex pattern are both of an arc shape.

The top and bottom surfaces of the first convex pattern, as well as the top and bottom surfaces of the second convex pattern, are all of an arc shape, allowing the thickness of the single-colored translucent cover to be gradually changed, thereby enhancing the gradient color effect and improving the beauty of the massager. At the same time, this design can also reduce stress concentration caused by sudden thickness changes and extend the service life.

Optionally, the width of the arc surface is greater than 2 mm.

The design of a width greater than 2 mm of the arc surface not only improves the stability of the first and second convex patterns in insertion connection with the corresponding concave patterns, but also ensures a tighter fit between the single-colored transparent cover and the non-transparent core, thereby ensuring the uniformity and aesthetics of the gradient color effect.

Optionally, the first convex pattern and/or the second convex pattern are arranged along a length direction and/or circumferential direction of the non-transparent core.

The first convex pattern and/or the second convex pattern are arranged along the length direction and/or circumferential direction of the non-transparent core, so that the massager has a uniform gradient color effect in multiple directions, improving the aesthetics of the product. At the same time, this arrangement can enhance the structural strength of the massager, reduce stress concentration caused by high-frequency vibration, and extend its service life.

Optionally, the non-transparent core is a single-colored non-transparent core or a multi-color non-transparent core.

The non-transparent core can be single-colored or multiple colors, which not only increases the color diversity of the massager and enhances the visual beauty of the product, but also forms a richer sense of hierarchy and contrast between different colors, thus better meeting the personalized needs of consumers. At the same time, the design of the multi-color non-transparent core also enables the massager to exhibit different visual effects under different lighting conditions, further enhancing the attractiveness of the product.

Optionally, the surface of the non-transparent core is provided with a pattern layer, which is connected to the single-colored transparent cover.

The surface of the non-transparent core is provided with a pattern layer, which is connected to a single-colored transparent cover and can effectively prevent the pattern layer from falling off due to high-frequency vibration, friction, and impact during use, thereby maintaining the beauty of the massager and avoiding skin allergies. At the same time, the combination of the pattern layer and the single-colored transparent cover makes the pattern more stable and durable, enhancing the user's experience.

Optionally, at least one waved section is extended on the outer surface of the single-colored transparent cover.

Providing at least one waved section can achieve a smooth transition of color on the surface of the massager, highlighting the gradient color effect.

Optionally, the outer surface of the single-colored transparent cover is a smooth surface.

A smooth surface also helps to improve the overall aesthetics and comfort of the massager.

Optionally, the outer surface of the single-colored transparent cover is defined with at least one recess. The recess, in conjunction with the non-transparent core, presents a better gradient color effect. The recess can be located at any position of the single-colored transparent cover and is combined with the first convex pattern, the second concave pattern, the second convex pattern, the first concave pattern, and the waved section to achieve a better gradient color effect.

Secondly, a method for preparing a gradient color massager is provided, including the following steps:

mixing uncured silicone rubber and shading filler evenly to obtain a viscous shading rubber material; curing and molding a first portion of the viscous shading rubber material to form a core bottom greenbody with a first receiving groove inside the core bottom greenbody; placing the vibrator inside the first receiving groove, and then filling a second portion of the viscous shading rubber material onto a surface of the vibrator, so that the viscous shading rubber material is tightly adhered to the vibrator and the core bottom greenbody; and performing curing to form the non-transparent core;

mixing uncured silicone rubber with a pigment evenly to obtain a viscous single-colored rubber material, and curing a first portion of the viscous single-colored rubber material to form a cover bottom greenbody with a second receiving groove inside the cover bottom greenbody; and accommodating the non-transparent core inside the second receiving groove; and filling the non-transparent core surface with a second portion of the viscous single-colored rubber material, and tightly bonding the viscous single-colored rubber material with the non-transparent core and the cover base greenbody, curing to form a single-colored transparent cover that tightly covers the outer surface of the non-transparent core, and the thickness of the outer surface of the single-colored transparent cover toward the non-transparent core varies, to obtain the gradient color massager.

It should be noted that the present application does not impose any specific limitations to the amount of viscous shading material used to form a core bottom greenbody with a first receiving groove inside the greenbody, as long as the amount used can meet the requirements for forming a core bottom greenbody with a first receiving groove inside the greenbody. In addition, there is no specific limit to the amount of viscous shading adhesive used to fill the surface of the vibrator, as long as the amount used can make the viscous shading adhesive tightly adhere to the vibrator and the core substrate.

Similarly, the present application does not impose any specific limitations to the amount of viscous single-colored material used to form a bottom greenbody with a second receiving groove inside the greenbody body, as long as the amount used can meet the requirements for forming a bottom greenbody with a second receiving groove inside the greenbody body. At the same time, there is no specific limit to the amount of viscous single-colored adhesive used to fill the surface of non-transparent cores, as long as the amount can make the viscous single-colored adhesive tightly adhere to the non-transparent core and the bottom greenbody.

In the above technical solution, uncured silicone rubber is a type of uncured silicone rubber that has viscosity and plasticity. It is formed by forming a light shielding rubber material with viscosity, which is then cured to form a core greenbody. After that, a vibrator is placed and filled with a silicone rubber material with viscosity. The viscous shielding rubber material is tightly adhered to the vibrator and the core greenbody, which, after further curing, has a stabilized structure.

After curing with a viscous single-colored rubber material to form a bottom greenbody, a non-transparent core is placed and then filled with a viscous single-colored rubber material to tightly bond the viscous single-colored rubber material with the non-transparent core and the bottom greenbody. After curing and forming, the non-transparent core is tightly connected to the single-colored transparent cover, improving the structural stability of the massager and obtaining single-colored transparent cover with varying thickness and depth. When observing the non-transparent core through the single-colored transparent cover, the clarity changes, thus achieving a visual effect of gradient color.

In addition, this manufacturing process tightly adheres the non-transparent core to single-colored transparent cover before they are fully cured, ensuring stable connection between the non-transparent core and single-colored transparent cover, improving the structural stability of the massager, avoiding detachment of the single-colored transparent cover during use, and enhancing the practicality and durability of the massager.

Optionally, conditions for curing and forming includes temperature of 50-95° C., forming time of 120-500 s, and forming pressure of 10-80 kg.

By adopting the above technical solution, the optimization of temperature, time, and pressure parameters during the curing process in the present application has been ensured, reducing damage to internal vibrators, improving the practicality and reliability of the product, and ensuring a tight connection between the single-colored transparent cover and the non-transparent core, making the massager have better gradient color effect and structural stability, reducing the possibility of detachment, and improving the beauty and practicality of the massager.

Optionally, the uncured silicone rubber includes the following weight percentages of raw materials:
40-60% of methyl vinyl silicone rubber;
10-30% of hydroxysilicone oil;
5-15% of hydrogen containing silicone oil;
3-8% viscosity modifier;
1-3% of platinum vulcanizing agent;
0.1-0.3% of inhibitors; and
filler in balance.

By adopting the above technical solution, it is possible to ensure that uncured silicone rubber has good flowability, adhesion, and mechanical strength under specific ratios. At the same time, the addition of viscosity modifiers significantly improves the adhesion stability between uncured silicone rubber and non-transparent cores, preventing delamination during long-term use and extending the product's service life. The selection and proportion of fillers have optimized the overall performance of uncured silicone rubber, making its structure more stable after molding, and improving the quality and reliability of the product.

Optionally, the viscosity modifier includes the following weight percentages of raw materials:
30-50% of 1,3-bis(3-methylacryloyloxypropyl) tetra (trimethylsiloxy) disiloxane;
30-50% of vinyl tris (dimethylsiloxane) silane;
2-10% of polyethylene glycol monomethyl ether polylactic acid diblock copolymer; and
10-20% of silane-PEG-OH.

By adopting the above technical solution, the viscosity modifier is composed of a specific proportion of 1,3-bis(3-methylacryloyloxypropyl) tetra (trimethylsiloxy) disiloxane, vinyltris (dimethylsiloxy) silane, polyethylene glycol monomethyl ether polylactic acid diblock copolymer, and silane-PEG-OH, which can significantly improve the adhesion stability between the single-colored transparent cover and the non-transparent core, prevent delamination or loosening during long-term use, and thus extend the service life of the massager. In addition, the synergistic effect of these components can ensure that the single-colored transparent cover forms stable concave-convex patterns on the surface of the non-transparent core, further enhancing the beauty and durability of the gradient color effect.

In summary, the present application can achieve at least one beneficial technical effect as follows.
1. By varying the thickness of the outer surface of the single-colored transparent cover toward the non-transparent core, a gradient color effect is achieved due to the thickness variation of the single-colored transparent cover, avoiding the problem of printing pattern layers easily falling off under high-frequency vibration and friction in conventional technology. By wrapping the non-transparent core around the outer surface of the single-colored transparent cover, the structural stability can be further improved, enabling the massager to have both better gradient color effect and structural stability;
2. The non-transparent core and single-colored transparent cover are connected by the interlocking of convex and concave patterns, enhancing the fixing effect between them and further improving the overall stability and gradient color effect of the massager; and
3. Production process of the present application: by changing the thickness of the single-colored transparent cover and providing the non-transparent core, a gradient color effect is achieved. Then the non-transparent core is tightly connected with the single-colored transparent cover by the production process and the use of the rubber material, the massager can achieve better gradient color effect and structural stability, reducing the possibility of detachment and improving the beauty and practicality of the massager.

DETAILED DESCRIPTION

The following provides further detailed explanations of the present application in conjunction with FIGS. 1-6 and the embodiments.

Description of Part of Raw Materials

The number average molecular weight of methyl vinyl silicone rubber is 100000 to 200000, in which the vinyl content is 0.17-0.32%;
Hydroxysilicone oil: Shengbang Organosilicon SI-H202
Hydrogen containing silicone oil: molecular formula $C_3H_9OSi \cdot (CH_4OSi)_n \cdot C_3H_9Si$
Platinum vulcanizing agent: Shenzhen Tianqi New Material Technology Co., Ltd., Model SK-P030;
The inhibitor is diallyl maleate;
Filler: gas-phase silica with a particle size of 100-300 nm;
The molecular structure of polyethylene glycol monomethyl ether polylactic acid diblock copolymer is as follows, where n and m are both 5:

The molecular structure of silane-PEG-OH is as follows, with an average molecular weight of 1000-2000:

The shading filler is titanium dioxide, 500-800 mesh;
The pigment is iron oxide yellow.

PREPARATION EXAMPLES OF UNCURED SILICONE RUBBER

Preparation Example 1

An uncured silicone rubber was prepared by the following method.
According to the weight percentage, 50% methyl vinyl silicone rubber, 30% hydroxy silicone oil, and 5% hydrogen containing silicone oil were weighed and put into a kneading machine. The materials were mixed at a speed of 100 r/min for 30 minutes to ensure thorough and uniform mixing to obtain mixture A. 3% of the viscosity modifier and 11% of the filler were weighed, placed in a stirring device, mixed at a speed of 100 r/min for 30 minutes to ensure thorough and uniform mixing to obtain mixture B. All mixture B was added to mixture A and mixing was continued for 30 minutes to obtain mixture C. 1% platinum vulcanizing agent and 0.1% inhibitor were added to mixture C and mixing was continued for 5 minutes to ensure thorough and uniform mixing to uncured silicone rubber with a weight of 10 kg.
According to weight percentage, 30% of 1,3-bis(3-methylacryloyloxypropyl) tetra (trimethylsiloxy) disiloxane, 48% of vinyltris (dimethylsiloxy) silane, 2% of polyethylene glycol monomethyl ether polylactic acid diblock copolymer, and 20% of silane-PEG-OH were uniformly mixed to obtain the viscosity modifier.

Preparation Examples 2-3

Preparation Examples 2-3 differed from Preparation Example 1 in that the amount of raw materials used was different, as shown in Table 1;

TABLE 1

Raw Material Amount for Preparation Examples 1-3

| Raw Material | | Preparation Example1 | Preparation Example2 | Preparation Example3 |
| --- | --- | --- | --- | --- |
| Methyl vinyl silicone rubber | | 50 | 55 | 60 |
| Hydroxysilicone oil | | 30 | 20 | 10 |
| Hydrogen containing silicone oil | | 5 | 10 | 15 |
| Platinum vulcanizing agent | | 1 | 2 | 3 |
| Filler | | 10.9 | 7.8 | 3.7 |
| Viscosity modifier | Amount | 3 | 5 | 8 |
| | 1,3-Bis (3-methylacryloyloxypropyl) tetra (trimethylsiloxy) disiloxane | 30 | 40 | 50 |
| | Vinyl tris (dimethylsiloxane) silane | 48 | 40 | 30 |
| | Polyethylene glycol monomethyl ether polylactic acid diblock copolymer | 2 | 5 | 10 |
| | Silane-PEG-OH | 20 | 15 | 10 |
| Inhibitor | | 0.1 | 0.2 | 0.3 |

COMPARATIVE PREPARATION EXAMPLES

Comparative Preparation Example 1

The Comparative Preparation Example 1 differed from Preparation Example 1 in that 1,3-bis(3-methylacryloyloxypropyl) tetra (trimethylsiloxy) disiloxane was replaced equally with vinyltris (dimethylsiloxy) silane.

Comparative Preparation Example 2

The Comparative Preparation Example 2 differed from Preparation Example 1 in that polyethylene glycol monomethyl ether polylactic acid diblock copolymer was equally replaced with vinyltris (dimethylsiloxane) silane.

Comparative Preparation Example 3

The Comparative Preparation Example 3 differed from Comparative Preparation Example 1 in that silane-PEG-OH was replaced equally with vinyltris (dimethylsiloxane) silane.

Comparative Preparation Example 4

The Comparative Preparation Example 4 differed from Comparative Preparation Example 1 in that the viscosity modifier was vinyltris (dimethylsiloxyalkyl) silane.

EXAMPLES

Example 1

Figure 1:
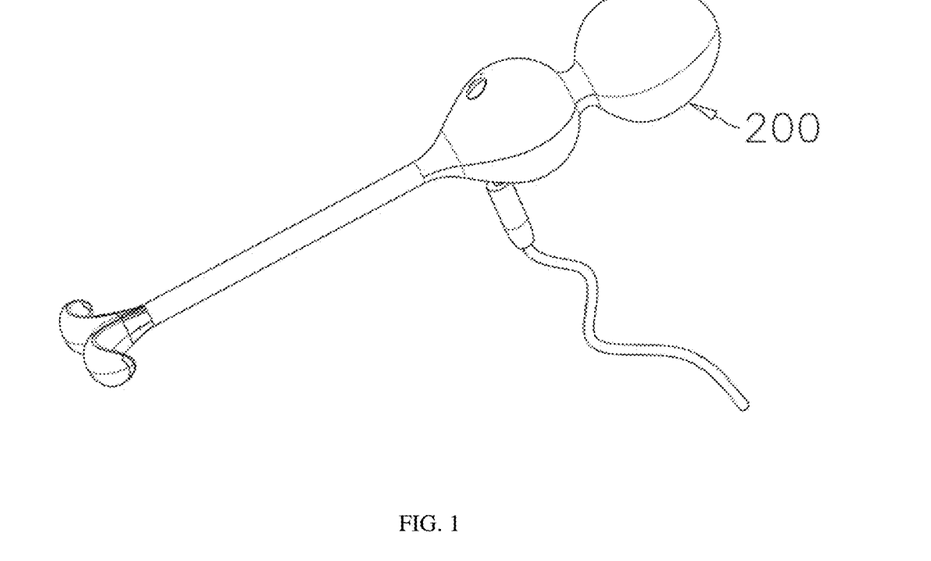
FIG. 1 is a schematic structural diagram of a massager according to Example 1.
Figure 2:
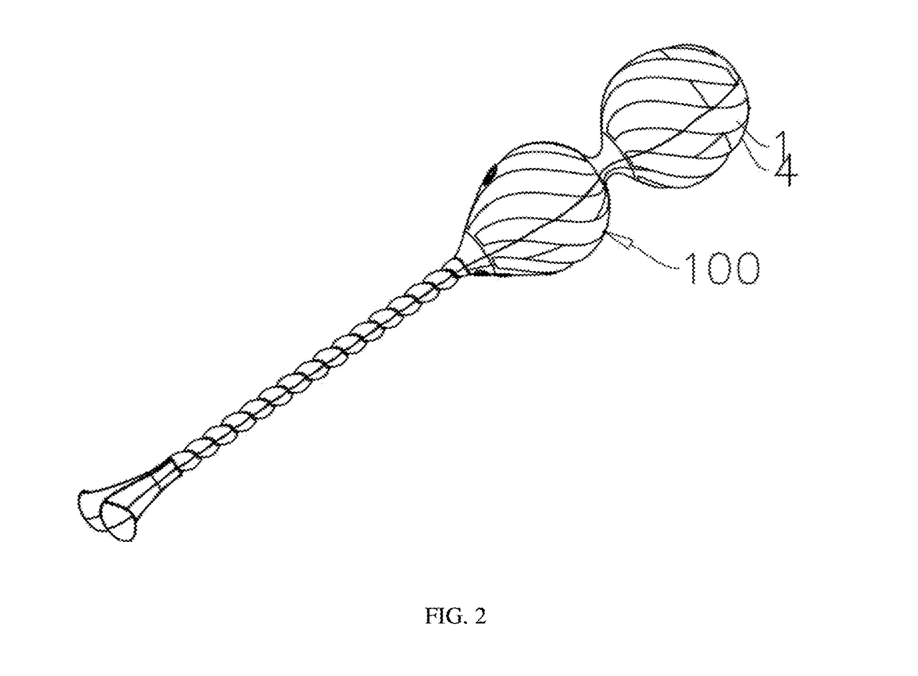
FIG. 2 is a schematic diagram of a non-transparent core structure according to Example 1.
Figure 3:
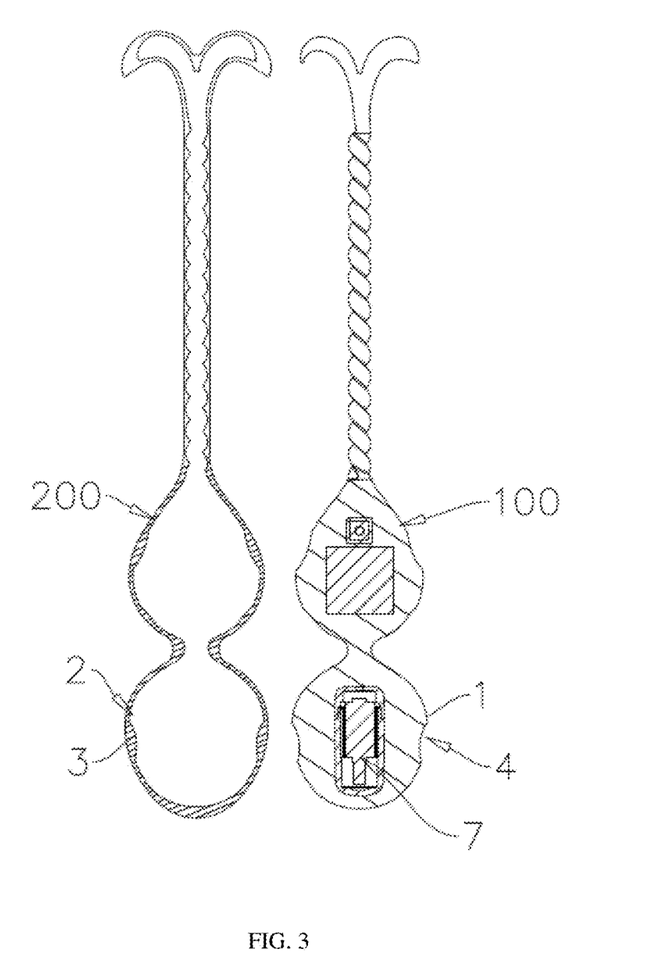
FIG. 3 is a schematic cross-sectional structural diagram of a massager according to Example 1.

The present embodiment provided a gradient color massager, as shown in FIGS. 1 and 2, including a non-transparent core 100 and a single-colored transparent cover 200 wrapped around the surface of the non-transparent core 100. The thickness of the outer surface of the single-colored transparent cover 200 toward the non-transparent core varied. By wrapping the core with the sleeve, the problem of printed pattern layer 5 falling off under high-frequency vibration and friction can be effectively avoided, thereby improving the aesthetics and service life of the massager.
Referring to FIG. 3, specifically, the non-transparent core 100 was provided with a vibrator 7 thereinside. The vibrator 7 includes a vibrating assembly, a battery, and a switch assembly. The non-transparent core can be made of rubber material or thermoplastic elastomer, preferably, rubber material, specifically silicone material. The silicone material wraps the vibrator 7 during molding, stabilizing and fixing it inside the non-transparent core. Due to the softness of silicone, the normal use of the vibrator 7 can be achieved. In addition, the non-transparent core 100 can be a single-colored non-transparent core or a multi-color non-transparent core, wherein the multi-color non-transparent core refers to a combination of multiple colors. In this Example, a single-colored non-transparent core was preferred, specifically a white non-transparent core.

The single-colored transparent cover 200 can be made of rubber material or thermoplastic elastomer. The preferred material in the present application was a colored and transparent silicone material, which can stably wrap around the surface of the non-transparent core during molding. With changed thickness in combination with the non-transparent core, it visually presents a gradient color effect, making the appearance of the massager more beautiful. The color of the single-colored transparent cover 200 can be red, yellow, blue, etc., and in this Example, it was yellow.

Specifically, there was at least one first convex pattern 1 protruding from the outer surface of the non-transparent core 100, and the number of first convex patterns 1 can be 1, 2, 3, 5, 10, 20, etc. When there were multiple first convex patterns 1, they can be distributed side by side or randomly, and the length of the first convex patterns 1 can be identical or different. The first convex patterns 1 can be arranged in the length direction and/or circumferential direction of the non-transparent core. Specifically, the first convex patterns 1 can be uniformly distributed in the length direction of the non-transparent core, forming a longitudinal gradient color effect. The second convex pattern 3 can be evenly distributed in the circumferential direction of the single-colored transparent cover 200, forming a circular gradient color effect. In this Example, it was preferred that the length of the first convex pattern 1 were identical, distributed side by side with a spacing of 3 mm and the same length, as shown in FIG. 2.

The single-colored transparent cover 200 was concave with a first concave pattern 2 that was insertion connected to the first convex pattern 1. The providing of the first convex pattern 1 and the first concave pattern 2 can enhance the stability of the connection between them, preventing the single-colored transparent cover 200 from loosening or falling off during use. The first convex pattern 1 can be of circular, square, or other shapes, while the first concave pattern 2 was designed to match it accordingly. For example, the first convex pattern 1 can be a circular protrusion, while the first concave pattern 2 was a corresponding circular groove.

At least one second concave pattern 4 was recessed on the outer surface of the non-transparent core 100, and the single-colored transparent cover 200 was convex with a second convex pattern 3 that was insertion connected to the second concave pattern 4. The providing of the second concave pattern 4 and the second convex pattern 3 was also aimed at enhancing the connection stability between them. The second concave pattern 4 can be of a straight line, a wave, or other shapes, while the second convex pattern 3 was designed to match it accordingly. Similarly, the second concave pattern 4 was matched with the second convex pattern 3, and in this Example, it was preferred that the number, distribution, length, direction, etc. of the first convex pattern 1 and the second convex pattern 3 were identical, and the first convex pattern 1 was excessively connected to the first concave pattern 2, as shown in FIG. 2.

The side of the first convex pattern 1 and the side of the first concave pattern 2 were both of an arc shape, and the side of the second convex pattern 3 and the side of the second concave pattern 4 were both of an arc shape. The top and bottom surfaces of the first convex pattern 1 were both of arc shape, while the top and bottom surfaces of the second convex pattern 3 were also of arc shape. The providing of the are surfaces gradually change the thickness of the single-colored transparent cover 200, presenting a better gradient color effect. In this Example, the width of all arc surfaces was greater than 2 millimeters, preferably 3 mm, so as to ensure sufficient contact area and connection strength.

The outer surface of the single-colored transparent cover 200 was a smooth surface. The design of a smooth surface can reduce friction and scratches, and improve the comfort of using the massager. The production of smooth surfaces can be achieved through polishing, grinding, or other suitable methods.

The implementation principle of this Example was that, this Example adopts a double-layer structure design of a non-transparent core and a single-colored transparent cover 200, and utilizes the thickness variation of the single-colored transparent cover 200 to achieve a gradient color effect, which not only solves the problem of traditional spray painted patterns easily falling off, but also improves the beauty and service life of the massager. The insertion connection design between the non-transparent core and the single-colored transparent cover 200 enhances the stability of their connection, preventing loosening or detachment under high-frequency vibration and friction. In addition, by adjusting the shape and position of the first convex pattern 1 and the second convex pattern 3, the direction and degree of the gradient color effect can be flexibly controlled, making the appearance of the massager more diverse.

Example 2

Figure 4:
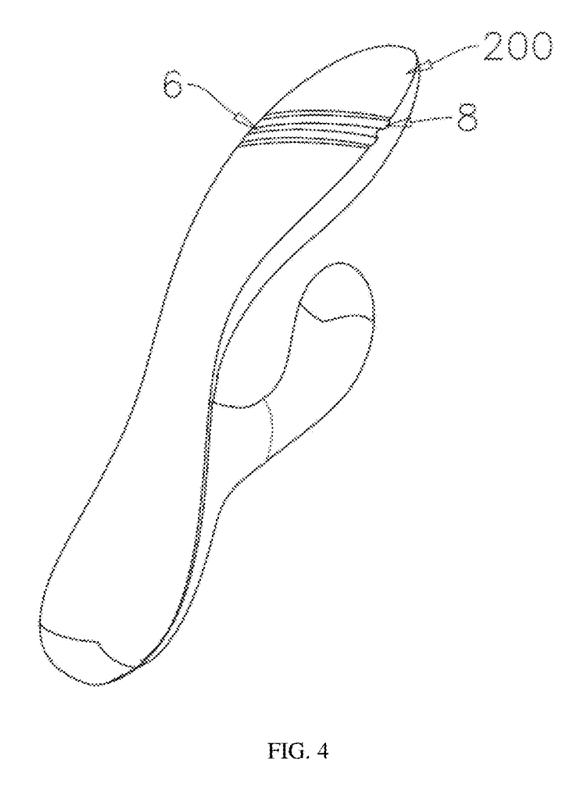
FIG. 4 is a schematic structural diagram of a massager in Example 2.
Figure 5:
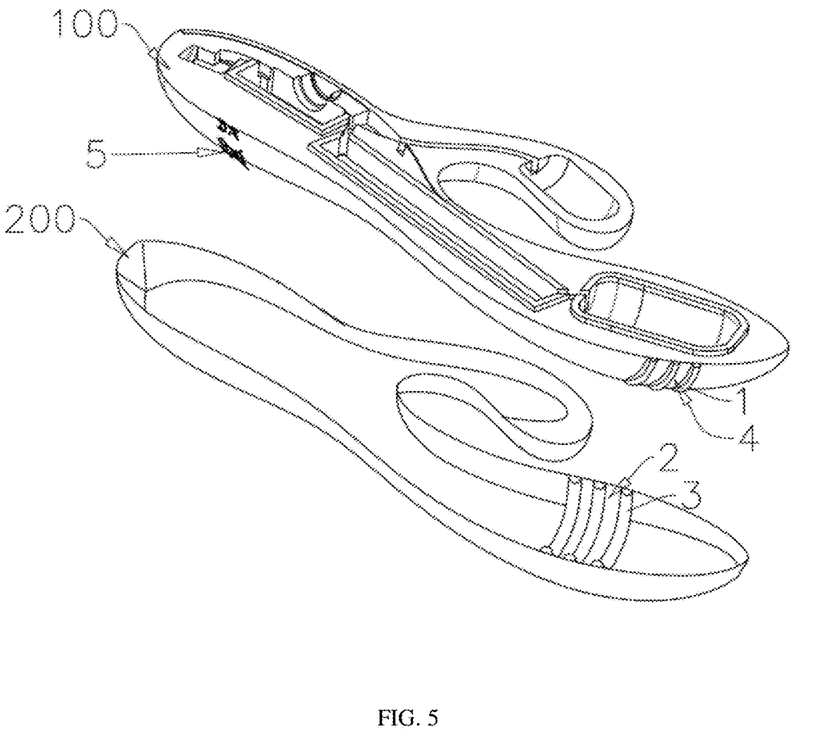
FIG. 5 is a schematic cross-sectional structural diagram of a massager according to Example 3.

The present embodiment provided a gradient color massager, as shown in FIGS. 4 and 5, including a non-transparent core 100 and a single-colored transparent cover 200 wrapped around the surface of the non-transparent core 100. The thickness of the outer surface of the single-colored transparent cover 200 toward the non-transparent core varied. The outer surface of the single-colored transparent cover 200 can be extended with at least one waved section 6. The design of the waved section 6 gradually changes the thickness of the single-colored transparent cover 200, creating a natural transition effect. The length and width of waved section 6 can be adjusted as needed to achieve the best visual effect. The position of the waved section 6 can be located at any position of the massager, including the tail, the middle, or the head of the massager. It can also gradually fade from one end of the massager to the other, or gradually deepen from the middle to both sides.

The waved section 6 can be formed by at least one raised pattern, so as present a better gradient color effect in combination with the non-transparent core. In this Example, it was preferred to use a raised pattern, which corresponds to the second convex pattern 3 and the first concave pattern 2. The waved section 6 can also be grid shaped, lattice shaped, or other shapes.

The outer surface of the single-colored transparent cover 200 was concave with at least one recess 8, which can be located at any position on the outer surface of the single-colored transparent cover 200. This example preferably uses at least one concave pattern to form the recess 8, which corresponds to the second convex pattern 3 and was connected to the convex pattern to present a concave-convex structure. In addition, the first convex pattern 1, the second convex pattern 3, the second concave pattern 4, and the first concave pattern 2 were used to achieve a better gradient color effect on the surface of the massager.

Example 3

The present example provides a gradient color massager, as shown in FIG. 5, including a non-transparent core 100 and a single-colored transparent cover 200 wrapped around the surface of the non-transparent core 100. The thickness of the outer surface of the single-colored transparent cover 200 toward the non-transparent core varied. The surface of the non-transparent core can also be provided with a pattern layer 5, which was connected to a single-colored transparent cover 200. Pattern layer 5 can be made by printing, spraying, or other suitable methods. The providing of pattern layer 5 allows for the selection of different patterns and colors as needed, making the appearance of the massager more personalized. At the same time, the pattern layer 5 was arranged on the non-transparent core and will not directly contact the human body.

Example 4

A method for preparing a gradient color massager as described in Example 1, prepared by the following method.

Uncured silicone rubber and shading filler were mixed evenly in a weight ratio of 100:5 to obtain a viscous shading rubber material. A portion of the viscous shading rubber material was placed into a mold for curing and forming, forming a core bottom greenbody with a first receiving groove inside the greenbody body. The vibrator was placed inside a first receiving groove, as seen in the mold structure shown in FIG. 6. The other portion of the viscous shading rubber material was placed into the middle mold, so that the viscous shading rubber material was tightly adhered to the vibrator and the core bottom greenbody, and then cure to obtain a non-transparent core with first convex and second concave patterns on the surface.

Figure 6:
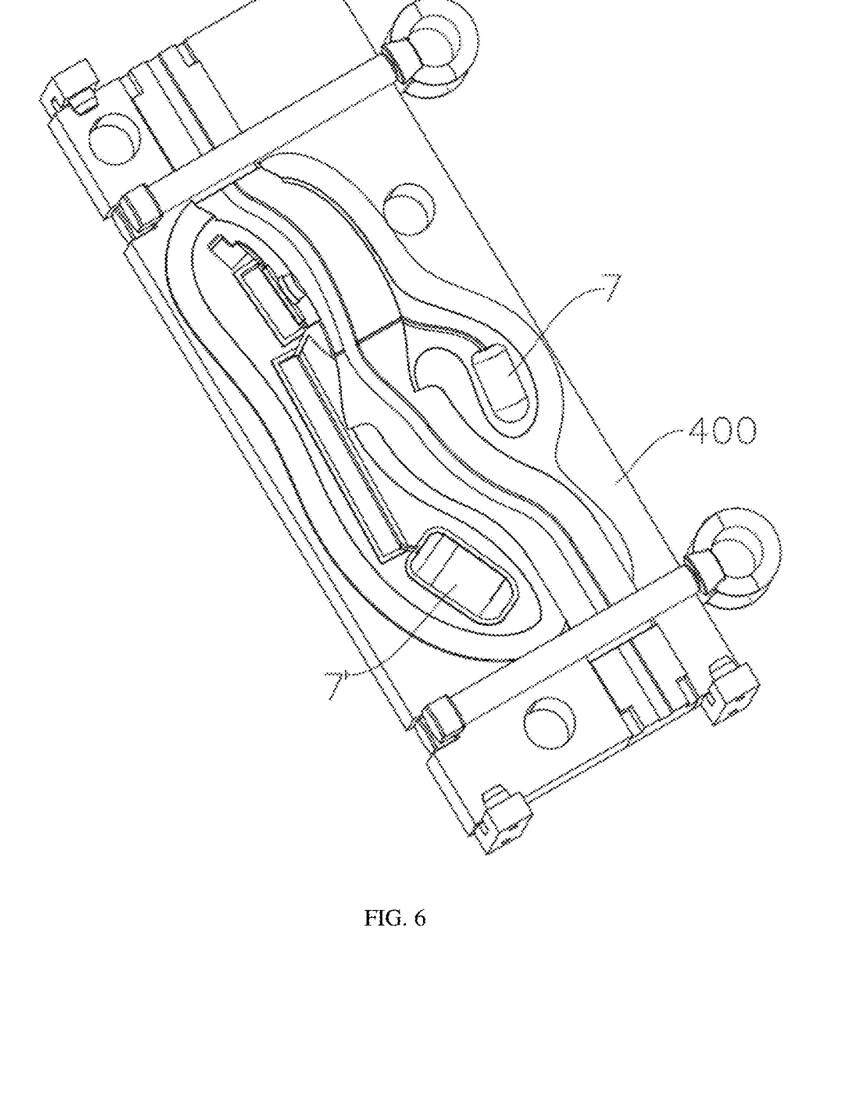
FIG. 6 shows a mold structure in Example 4.

Uncured silicone rubber and a pigment were mixed in a weight ratio of 100:1 to obtain a viscous single-colored rubber material. A portion of the viscous single-colored rubber material was cured to form a cover bottom greenbody with a second receiving groove thereinside. Then the non-transparent core was provided inside the second receiving groove.

The other portion of the viscous single-colored rubber material was filled onto the surface of the non-transparent core, and tightly bond the viscous single-colored rubber material with the non-transparent core and the cover bottom greenbody. Then, they were placed in the mold and cured to form a single-colored transparent cover that tightly covers the outer surface of the non-transparent core. The single-colored transparent cover corresponds to the first convex pattern and the second concave pattern, respectively, forming the first concave pattern and the second convex pattern that were interlocked with it, to obtain a gradient color massager.

In particular, the curing and molding conditions in the above processes included: temperature of 95° C., molding time of 120 s, and molding pressure of 80 kg. Untreated silicone rubber was obtained by mixing gas-phase white carbon black, platinum vulcanizing agent, methyl vinyl silicone rubber, hydrogen containing silicone oil, and inhibitor in a weight ratio of 1:0.1:10:3:0.01.

Example 5

The Example 5 differed from Example 4 in that the curing and molding conditions in the process are: temperature of 50° C., molding time of 500 s, and molding pressure of 10 kg.

Example 6

The Example 6 differed from Example 4 in that the curing and molding conditions in the process are: temperature of 90° C., molding time of 300 s, and molding pressure of 50 kg.

Example 7-13

The Examples 7-13 differed from Example 4 in that the source of uncured silicone rubber was different, as shown in Table 2;

TABLE 2

Sources of uncured silicone rubber from Examples 7-13

| Examples | Sources of uncured silicone rubber |
| --- | --- |
| Example 7 | Preparation Example1 |
| Example 8 | Preparation Example2 |
| Example 9 | Preparation Example3 |
| Example 10 | Comparative Preparation Example1 |
| Example 11 | Comparative Preparation Example2 |
| Example 12 | Comparative Preparation Example3 |
| Example 13 | Comparative Preparation Example4 |

Performance Testing Experiment

The single-colored uncured silicone rubber obtained from Examples 4 and 7-13 was placed into a mold, and then put into a vulcanizing machine for 120 seconds at a temperature of 95° C. to obtain test samples, which was used for the following mechanical property tests.

Testing Methods/Experimental Methods

Mechanical properties: referring to the testing method ASTMD412 for testing fracture strength and elongation, with a thickness of 2 mm;

Structural stability: the gradient color massager (weighing 238 g) obtained from Example 4-13 was placed horizontally, and then subjected to a free fall from a 5 m platform. This process was repeated for 10 times to check if it can be used normally. It was checked if the single-colored transparent cover was damaged and cut open to see if there was any detachment between the non-transparent core and the single-colored transparent cover. The corresponding experimental results were recorded.

The above experiments were shown in Table 1;

| Experimental data of Examples 5-14 | | | |
| --- | --- | --- | --- |
| Test items | Breaking strength (MPa) | Elongation (%) | Structural stability |
| Example 4 | 18.7 | 598 | Unusable, with damage and peeling |
| Example 5 | \ | \ | Unusable, with damage and peeling |
| Example 6 | \ | \ | Unusable, with damage and peeling |

-continued

Experimental data of Examples 5-14

| Test items | Breaking strength (MPa) | Elongation (%) | Structural stability |
|---|---|---|---|
| Example 7 | 24.6 | 707 | Usable, without damage or peeling |
| Example 8 | 25.7 | 705 | Usable, without damage or peeling |
| Example 9 | 24.1 | 711 | Usable, without damage or peeling |
| Example 10 | 22.3 | 678 | Usable, without damage or peeling |
| Example 11 | 23.6 | 684 | Usable, without damage or peeling |
| Example 12 | 23.1 | 681 | Usable, without damage or peeling |
| Example 13 | 19.1 | 632 | Unusable and damaged, without peeling |

In combination with Example 7, Example 4 and Table 3, it can be seen that the tear strength and elongation of Example 7 are higher than those of Example 4, indicating that the single-colored uncured silicone rubber produced by the present application has better mechanical properties, which can reduce cracking, tearing and other phenomena during use. At the same time, in Example 4, the sample cannot be used, has damage and detachment, while in Example 7, the samples did not show the above phenomena, indicating that the uncured silicone rubber produced by the present application has better effects, making the gradient color massager have better structural stability and mechanical properties.

In combination with Example 7, Examples 10-13 and Table 3, it can be seen that the tear strength and elongation of Example 7 are higher than those of Examples 10-13, indicating that the use of 1,3-bis(3-methylacryloyloxypropyl) tetra (trimethylsiloxy) disiloxane, vinyltris (dimethylsiloxy) silane, polyethylene glycol monomethyl ether polylactic acid diblock copolymer, and silane-PEG-OH compound has a better effect, further enhancing the bonding and mechanical properties of uncured silicone rubber, stabilizing the structure of the obtained gradient color massager, and providing its durability.

This specific example are only an explanation of the present application and are not a limitation to the present application. After reading this specification, those skilled in the art may make modifications to the present embodiment as needed without creative contributions, but as long as they are within the scope of the claims of the present application, they are protected by the Patent Law.

LISTING OF REFERENCE SIGNS

100. Non-transparent core
200. Single-colored transparent cover
1. First convex pattern
2. First concave pattern
3. Second convex pattern
4. Second concave pattern
5. Pattern layer
6. Waved section
7. Vibrator
8. Recess
400. Mold structure

What is claimed is:

1. A gradient color massager, comprising a non-transparent core and a single-colored transparent cover wrapped around an outer surface of the non-transparent core, wherein a vibrator is embedded inside the non-transparent core, the non-transparent core wraps the vibrator, a thickness of an outer surface of the single-colored transparent cover toward the non-transparent core varies, the single-colored transparent cover is connected to the non-transparent core, and the non-transparent core is made of rubber material;
    wherein the outer surface of the non-transparent core is provided with at least one first convex pattern, and the single-colored transparent cover is provided with a first concave pattern into which the at least one first convex pattern is inserted to be connected to at least one first convex pattern;
    wherein at least one second concave pattern is provided on the outer surface of the non-transparent core, and the single-colored transparent cover is provided with a second convex pattern configured to be inserted into the at least one second concave pattern to be connected to at least one second concave pattern; and
    wherein at least one of the at least one first convex pattern or the second convex pattern is arranged along a length direction and a circumferential direction of the non-transparent core;
    wherein the non-transparent core is prepared from a viscous shading rubber material; and the viscous shading rubber material is prepared by mixing uncured silicone rubber and shading filler evenly;
    the uncured silicone rubber comprises the following weight percentages of raw materials:
        40-60% of methyl vinyl silicone rubber;
        10-30% of hydroxysilicone oil;
        5-15% of hydrogen containing silicone oil;
        3-8% of viscosity modifier;
        1-3% of platinum vulcanizing agent;
        0.1-0.3% of inhibitors; and
        filler in balance;
    wherein the viscosity modifier comprises the following weight percentages of raw materials:
        30-50% of 1,3-bis(3-methylacryloyloxypropyl) tetra (trimethylsiloxy) disiloxane;
        30-50% of vinyl tris (dimethylsiloxane) silane;
        2-10% of polyethylene glycol monomethyl ether polylactic acid diblock copolymer; and
        10-20% of silane-PEG-OH.

2. The gradient color massager according to claim 1, wherein a side of the at least one first convex pattern and a side of the first concave pattern are arc-shaped surfaces, a side of the second convex pattern and a side of the at least one second concave pattern are arc-shaped surfaces, a top surface of the at least one first convex pattern and a bottom surface of the at least one first convex pattern are arc-shaped surfaces, a top surface of the second convex pattern and a bottom surface of the second convex pattern are arc-shaped surfaces, and a width of each of the arc-shaped surfaces is greater than 2 mm.

3. The gradient color massager according to claim 1, wherein the non-transparent core is a single-colored non-transparent core or a multi-color non-transparent core.

4. The gradient color massager according to claim 1, wherein a surface of the non-transparent core is provided with a pattern layer, and the pattern layer is connected to the single-colored transparent cover.

5. The gradient color massager according to claim 1, wherein at least one of:
    at least one waved section extends on the outer surface of the single-colored transparent cover;

the outer surface of the single-colored transparent cover is defined with at least one recess; or the outer surface of the single-colored transparent cover is a smooth surface.

6. The gradient color massager according to claim 1, wherein the single-colored transparent cover is made of the rubber material or a thermoplastic elastomer.

7. A method for preparing the gradient color massager according to claim 1, comprising the following steps:

mixing the uncured silicone rubber and the shading filler evenly to obtain the viscous shading rubber material; curing and molding a first portion of the viscous shading rubber material to form a core bottom greenbody with a first receiving groove inside the core bottom greenbody; placing the vibrator inside the first receiving groove, and then filling a second portion of the viscous shading rubber material onto a surface of the vibrator, so that the viscous shading rubber material is adhered to the vibrator and the core bottom greenbody; and performing curing to form the non-transparent core;

mixing the uncured silicone rubber with a pigment evenly to obtain a viscous single-colored rubber material, and curing a first portion of the viscous single-colored rubber material to form a cover bottom greenbody with a second receiving groove inside the cover bottom greenbody; and accommodating the non-transparent core inside the second receiving groove; and filling the non-transparent core with a second portion of the viscous single-colored rubber material, bonding the viscous single-colored rubber material with the non-transparent core and the cover bottom greenbody, and curing to form the single-colored transparent cover that covers the outer surface of the non-transparent core, wherein the thickness of the outer surface of the single-colored transparent cover toward the non-transparent core varies, to obtain the gradient color massager;

wherein conditions for curing and forming comprise temperatures of 50-95° C., forming time of 120-500 s, and forming pressure of 10-80 kg/cm$^2$.

* * * * *